J. W. HEDENBERG.
Coffee Pot.
No. 22,501.
Patented Jan. 4, 1859.
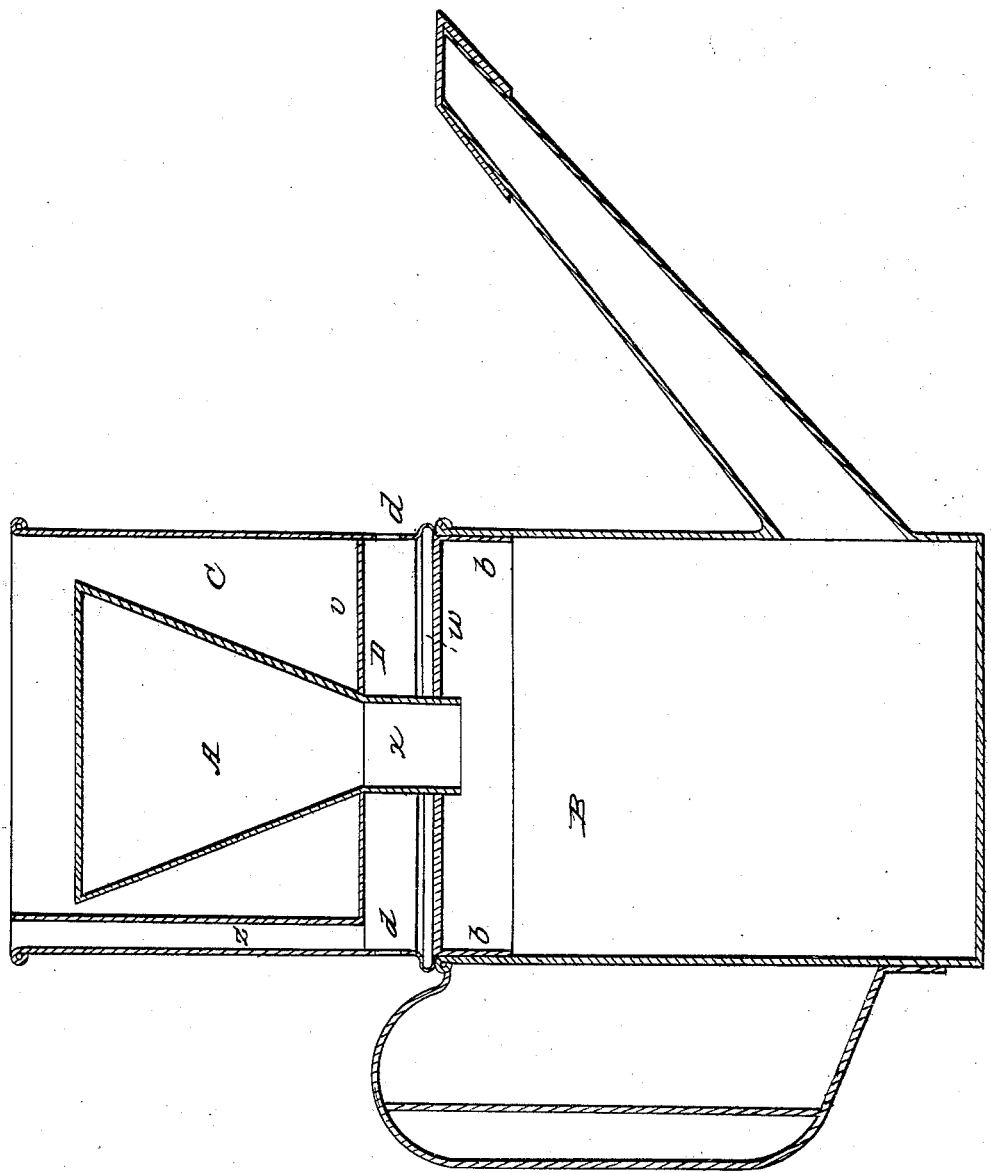

UNITED STATES PATENT OFFICE.

JOHN W. HEDENBERG, OF ST. LOUIS, MISSOURI.

COFFEE-POT.

Specification of Letters Patent No. 22,501, dated January 4, 1859.

*To all whom it may concern:*

Be it known that I, JOHN W. HEDENBERG, of the city of St. Louis and State of Missouri, have invented a new and useful Improvement in Coffee-Pots; and I do hereby declare that the following is a full, clear, and exact description of the same, reference being had to the annexed drawing, making part of this specification, in which—

Figure 1 is a vertical section through a coffee pot, with the said improvement attached.

This improvement is applied to a coffee pot having a reservoir and condenser attached for the purpose of condensing the steam as fast as generated, and thus preserve the aroma of the coffee which would otherwise be carried off with the steam. And the improvement consists, in making an air chamber between the reservoir and the coffee pot, so as to prevent the water in the reservoir from becoming heated by immediate contact with the coffee pot.

The following description will enable any one skilled in the arts to make and use my invention.

B is a coffee pot which may be made in the ordinary form.

C is a reservoir which is fitted with a condenser as shown at A. This reservoir is provided with a flange as shown at $b$ $b$ which fits in the top of the pot as shown, so that the reservoir forms a cover for the coffee pot.

The condenser A communicates with the coffee pot as shown at $x$. The reservoir C is provided with a false bottom shown at V, so that an open space of say, about three quarters of an inch is left between the main bottom W and the false bottom V. This open space forms an air chamber from which there leads a pipe shown at Z, to the top of the reservoir. Around the outside of this air chamber, there are a number of small holes made to admit the air, shown at $d$ $d$. Now suppose the pot B to be filled with water; and made hot, the bottom W would also be heated and if there was no air chamber D the water in the reservoir would also be heated, which would destroy in a measure the condensing capacity of the condenser A. But by the above described arrangement of air chamber the water in the reservoir is kept cool, for the heat from the coffee pot rarefies the air in the chamber, which causes it to rise, and pass up through the chimney Z, which thus causes a constant current of cold air to pass through the chamber D which prevents the water from heating in the reservoir C.

I do not claim the condenser or reservoir, as these have been used before. But

What I claim as my invention and desire to secure by Letters Patent is—

The application of the chimney or pipe to the open space between the coffee pot and the condenser, for the purpose of causing a current of cold air to pass between the coffee pot and condenser, as set forth.

JOHN W. HEDENBERG.

Witnesses:
AMOS BROADWAY,
P. W. JOHNSTONE.